United States Patent [19]

Montgomery

[11] 3,884,887

[45] May 20, 1975

[54] VINYL COPOLYMERS AND PROCESSES FOR MAKING THEM

[75] Inventor: Donald R. Montgomery, Charleston, W. Va.

[73] Assignee: Union Carbide Corporation, New York, N.Y.

[22] Filed: July 26, 1972

[21] Appl. No.: 275,356

Related U.S. Application Data

[63] Continuation-in-part of Ser. No. 200,569, Nov. 19, 1971, Pat. No. 3,755,271.

[52] U.S. Cl. ... 260/80.75; 117/161 K; 117/161 LN; 117/161 UZ; 117/161 UT; 260/873; 260/853; 260/856

[51] Int. Cl. ............................................. C08f 15/40

[58] Field of Search ........................ 260/80.75, 86.3

[56] References Cited

UNITED STATES PATENTS

| | | | |
|---|---|---|---|
| 3,260,704 | 7/1966 | Slocombe | 260/80.75 |
| 3,635,914 | 1/1972 | Daniels et al. | 260/80.75 |

FOREIGN PATENTS OR APPLICATIONS

| | | | |
|---|---|---|---|
| 1,097,613 | 1/1968 | United Kingdom | 260/80.75 |
| 1,005,796 | 9/1965 | United Kingdom | 260/80.75 |

*Primary Examiner*—John C. Bleutge
*Attorney, Agent, or Firm*—George A. Skoler

[57] ABSTRACT

This invention is concerned with random copolymers of vinyl chloride and a hydroxyalkyl acrylates, which have a relatively narrow molecular weight distribution. These copolymers are particularly compatible with solvent based thermosetting or airdrying coating resins and are coreactive therewith.

3 Claims, No Drawings

VINYL COPOLYMERS AND PROCESSES FOR MAKING THEM

This application is a continuation-in-part of copending U.S. Pat. application Ser. No. 200,569 filed Nov. 19, 1971 now U.S. Pat. No. 3,755,271.

It has been found that certain copolymers of vinyl chloride with hydroxyalkyl acrylates or hydroxyalkyl methacrylates, with or without the inclusion of a third polymerizable monomer, possess a unique combination of useful properties not found in other vinyl resins. Specifically, polymers prepared according to this invention possess a breadth of compatibility with other film-forming resins such as alkyds and amine-formaldehyde resins (i.e. ureas, melamines, and triazines) not achieved by other vinyl chloride polymers with the exception of certain vinyl chloride/vinyl acetate/vinyl alcohol interpolymers. The polymers of this invention also possess a degree of reactivity in thermoset reactions with, for example, urea-formaldehyde resins or isocyanate prepolymers unmatched by other hydroxyl-bearing vinyl chloride polymers including the above-mentioned vinyl alcohol terpolymers. In addition, due to the uniform nature of the polymers and their relatively narrow molecular weight distributions, they have substantially improved solubility compared to less uniform polymers at the same average molecular weight. This means coatings formulations with higher solids content can be prepared at the same solution viscosity with obvious economic and ecological advantages.

This invention specifies an uniformly random copolymer of vinyl chloride, an acrylic ester having the formula:

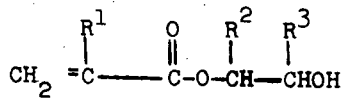

wherein $R^1$, $R^2$ and $R^3$ may be hydrogen or methyl, and optionally, an additional polymerizable monomer (or monomers) chosen from alkyl(1–8 carbon atoms) esters of polymerizable alpha, beta-ethylenically unsaturated acids such as acrylic, methacrylic, maleic, fumaric, itaconic, and the like, and vinyl esters of saturated fatty acids of 1–6 carbon atoms, such as vinyl acetate, vinyl propionate, and the like, in which the vinyl chloride mer content is about 70 to about 90 weight percent, based on the copolymer weight, the acrylic ester mer content is about 10 to about 30 weight percent, based on the copolymer weight, and the additional monomer(s) mer content is 0 to about 15 weight percent, based on the copolymer weight, and the said copolymer has an inherent viscosity of about 0.2 to about 0.5 determined at 30°C using 0.2 grams of the copolymer in a deciliter of cyclohexanone.

This invention also encompasses a process whereby the above vinyl copolymers may be prepared in such a manner as to give a reactive vinyl resin wherein the reactivity thereof is uniformly and randomly dispersed within its molecular structure and furthermore with a relatively narrow distribution of the molecular weights of the individual polymer molecules characterized by a ratio of weight average to number average molecular weights of not greater than about 2.

The polymerization of the present invention is carried out in solution. It is preferred to use esters, e.g., isopropyl acetate, butyl acetate, etc., or ketones, e.g., acetone, 2-butanone, etc., as solvents. The ratio of the amount of solvent to the amount of monomers in the polymerization vessel may vary between about 0.3:1 to about 4:1, depending upon the molecular weight desired; it is, however, a desirable part of this invention that the said ratio be held within a relatively narrow range throughout the polymerization. Similarly, the temperature at which the polymerization is carried out may be selected from a broad range, say about 35°C to about 80°C, with appropriate consideration given to the initiator used and the reaction rate and the molecular weight desired. The combination of temperature, monomers to solvent ratio and specific solvent used control the molecular weight of the resin. Additional chain transfer agents may be added; but, in general, are not necessary. As polymerization initiators one may use any of the oil-soluble compounds which thermally yield free radicals, such as dibenzoyl peroxide, dilauroyl peroxide, diacetyl peroxide, azobis(isobutyronitrile), isopropyl peroxydicarbonate, acetyl cyclohexanesulphonyl peroxide, etc., in amounts from about 0.01 to about 3 percent by weight (based on monomers) as may be appropriate to the rate desired. The product may be used in its solution after stripping unreacted monomers by conventional techniques, or alternatively, the polymer may be precipitated and supplied as a dry powder for latter redissolution in the solvent combination of choice for the application.

The compositional uniformity and narrow molecular weight distribution of the product of this invention are achieved by maintaining essentially constant monomer-to-monomer ratios and total monomers-to-solvent ratio throughout the polymerization. This may be achieved by choosing an initial charge to the polymerization vessel such that the initial polymer formed will have the composition and molecular weight desired for the product, and then feeding a mixture of all of the monomers in the relative proportions to each other and at the rate at which they are being incorporated into the polymer. The net effect of this procedure is the addition of polymer to the autoclave without change in the monomer-to-monomer or monomer-to-solvent ratios. The more accurately the feed rate is matched to the polymerization rate, the more uniform the product will be. The polymerization may be continued in this manner until an appropriate solids content is achieved in the autoclave at which time the product may be recovered. Optionally, the feed composition may be changed to correspond to the overall composition of the contents of the autoclave (with the polymer calculated as its monomer content) and the process run on a continuous basis, with the feed rate set to maintain the conversion level and product removed at a rate to maintain the liquid level in the autoclave. An illustrative example of the embodiment of this invention is given in Example 1.

There is described in British Pat. Specification No. 1,097,613 a process for the manufacture of a terpolymer of vinyl chloride, vinyl acetate and a glycol monoacrylate or monomethacrylate. The reaction described in that patent for preparing the terpolymer involved a batch reaction in which vinyl chloride, vinyl acetate and a certain amount of the glycol monoacrylate were mixed in combination with a free-radical initiator in a solvent. The reaction was effected in a pressure tight polymerization vessel at 60°C at superatmospheric pressures of, initially, 3.45 atmospheres gauge. The pressure decreased during the course of the polymerization; at the levels of 2, 1.5, and 1 atmosphere gauge, there was added to the contents of the polymerization vessel additional amounts of glycol monoacrylate dissolved in solvent. When the pressure had dropped to 0.35 atmospheres gauge the reactor was vented and there was obtained a solution which had a solids content of 37 percent. It is claimed that "The composition of the copolymers corresponds practically to that of the initial mixtures of monomers." For the example cited, the ratio of monomers charged to the autoclave was 87 percent vinyl chloride, 5 percent vinyl acetate and 8 percent propylene glycol monoacrylate; this is the composition claimed for the terpolymer obtained, apparently without further analysis.

Such a batchwise polymerization, even with intermittent feed of the most reactive monomer, produces a polymer with widely varying composition on a molecular basis and a very broad molecular weight distribution. These characteristics cause serious deficiencies in many properties, such as solubility, compatibility with other coatings materials, and reactivity in thermoset coatings systems, as is documented in the examples below. In the following examples, all parts are parts by weight.

EXAMPLE 1

The preparation of the resin of the present invention may be illustrated as follows: 540 parts of vinyl chloride, 32 parts of vinyl acetate, 37 parts of beta-hydroxypropyl acrylate (HPA)* and 991 parts of acetone are charged to a polymerization autoclave and the temperature raised to 69°C. An acetone solution of isopropyl peroxydicarbonate (0.6 parts) catalyst is fed to the autoclave, then more isopropyl peroxydicarbonate was added at a rate of 1 part per hour to give the desired overall polymerization rate. A mixture of 680 parts of vinyl chloride, 43 parts of vinyl acetate and 127 parts of HPA is then fed to the autoclave at a rate equal to the rate of conversion of monomers to polymer. The catalyst is then fed at a rate of 1 part per hour. When the solids content of the autoclave reaches an appropriate level, e.g. 32 percent, one may optionally carry out a continuous process polymerization by feeding an appropriate mixture of monomers and solvent and taking off product solution at an equivalent rate. For this illustrative example the feed mixture is 49.3 parts vinyl chloride, 2.9 parts vinyl acetate, 5.4 parts HPA and 42.4 parts acetone. In this case, the catalyst feed was reduced to 0.8 part per hour. The resin is precipitated, washed and dried. Analysis shows 80.1 percent poly(vinyl chloride), 15.1 percent poly(hydroxypropyl acrylate) and inherent viscosity 0.31. This procedure, or obvious variations of it, gives very uniform random distribution of the functional monomer throughout all of the polymer molecules and a narrow molecular weight distribution.

* A 7/3 mole ratio of 2-hydroxypropylacrylate and 1-methyl-2-hydroxyethylacrylate.

EXAMPLE 2

The procedure described in British Pat. Specification No. 1,097,613 was followed as closely as possible, with a slight modification of the monomer ratios. 454 Parts (by weight) of vinyl chloride, 28 parts of vinyl acetate, 19.6 parts of propylene glycol monoacrylate (HPA) and 1.95 parts of azobis(isobutyronitrile) were dissolved in 980 parts of n-butyl acetate in a polymerization autoclave which had been thoroughly purged with nitrogen. The residual nitrogen was then vented from the autoclave vapor space. The contents of the autoclave were then heated to 60°C at which time a pressure of 55 psig (3.75 atmospheres gauge) was recorded. Contrary to expectations based on the above patent, after 3 hours the pressure had dropped by only 5 psig. Since the patented procedure called for a pressure drop of 1.45 atmospheres (22 psi) before the first of three monomer additions, this was an unacceptably slow rate for our purposes. An attempt to salvage the run was made by adding 4 more parts of azobis(isobutyronitrile) dissolved in 60 parts of n-butyl acetate. After 3 additional hours the pressure had dropped only to 36 psig (2.45 atm. gauge) and the run was terminated as too slow to be practical. The conversion of monomers to polymer was approximately 25 percent at this stage. A small sample was precipitated and the inherent viscosity was measured as 0.37. The product was not further characterized.

EXAMPLE 3

The same initial charge and procedure was followed as in Example 2, except 10 parts of azobis(isobutyronitrile) was used and the temperature was 65°C. In this case, the initial pressure was 60 psig (4.1 atm. gauge). After 2 hours reaction time, the pressure had dropped to 44 psig at which time 19.6 parts of hydroxypropyl acrylate dissolved in an equal weight of n-butyl acetate was addded. Similar feed additions were made at 4 hours at 34 psig (2.3 atm. gauge) and at 7 hours at 28 psig (1.9 atm. gauge). The temperature was maintained for an additional 16 hours at which time the pressure had dropped to 27 psig (1.8 atm. gauge). At this time the autoclave was vented and the product recovered. The solution after venting had a solids content of about 33 percent and was essentially a gel after cooling. The resin was precipitated, washed and dried. Analysis of the resin showed 82.7 percent poly(vinyl chloride), 12.7 percent poly(hydroxypropyl acrylate) and 0.25 inherent viscosity. This resin was then compared for solubility, compatibility and coatings properties with a uniform terpolymer of comparable composition made according to the current invention.

EXAMPLE 4

To demonstrate that the modest change in monomer proportions in Examples 2 and 3 relative to the U.S. Pat. No. 1,097,613 was not significant in the slow polymerization observed, another polymerization was made with precisely the same ratios of ingredients as the example cited except 5 times as much initiator was used. Thus 574 parts of vinyl chloride, 33 parts of vinyl acetate, 13.2 parts of hydroxypropyl acrylate, 930 parts of n-butyl acetate and 10 parts azobis(isobutyronitrile) were charged to the autoclave as in Example 2. The polymerization temperature was held at 60°C. The initial pressure was recorded as 62 psig (4.2 atm. gauge). Additions of 13.2 parts of hydroxypropyl acrylate in equal weight of n-butyl acetate were made at 2½ hours (50 psig), 4½ hours (42 psig) and 6½ hours (36 psig). After an additional 16 hours, the pressure was still 23 psig. The autoclave was vented and the product recovered. Upon cooling, the product was a very thick gel. The polymer was precipitated, washed and dried. Analysis showed 87.0 percent poly(vinyl chloride), 10.3 percent poly(hydroxypropyl acrylate) and 0.35 inherent viscos-

TABLE I

FILM COMPATIBILITY OF VINYL RESINS WITH COMMERCIAL ALKYD AND AMINE-FORMALDEHYDE RESINS[1]

| Vinyl Resin No. | Vinyl Resin Comonomer Ratio, VCl/HPA/VOAc[2] | Alkyd Resins | | | Amine Resins | |
|---|---|---|---|---|---|---|
| | | Duraplex ND-77B | Neolyn 35D | Beckosol 1307 | Uformite MX-61 | Beetle XB-1037 |
| I | 80/20/0 | 10 | 10 | 10 | 10 | 10 |
| II | 75/25/0 | 10 | 10 | 10 | 10 | 10 |
| III | 80/15/5 | 10 | 10 | 10 | 10 | 10 |
| IV | 80/10/10 | 7 | 10 | 7 | 9 | 10 |
| V | 80/5/15 | 5 | 4 | 5 | 3 | 3 |
| VI | 58/8/34 | 3 | 4 | 3 | 6 | 3 |

[1]Film compatibility ratings: 3 = incompatible with compatibility increasing as numerical rating increases until optimum compatibility of 10 is attained. Compatibility ratings for combinations of vinyl resin with other resin at a ratio of 4 parts vinyl resin to 1 part other resin.
[2]VCl = vinyl chloride, HPA = hydroxypropyl acrylate, VOAc = vinyl acetate (weight ratio of copolymers).

ity. To illustrate the broad molecular weight distribution that is produced by the batchwise procedure, a sample taken just before the last monomer addition had an inherent viscosity of 0.41 (PVC = 89.6 percent and HPA = 8.3 percent). Thus a modest increment in conversion caused a sizeable drop in the average molecular weight for the total polymer, which requires that the increment itself be very low.

The proportion of comonomers in the subject copolymer system, when prepared to produce compositional uniformity, and a narrow molecular weight range, is the critical factor in determining compatibility with other resin systems which are frequently employed in combination with vinyl resins in coating applications. For example, alkyd resins may be combined with vinyl resins to achieve the desired application economics and/or performance. A coating based on an alkyd resin may be modified with a vinyl resin containing reactive functionality to improve adhesion, toughness, flexibility or some other property of the coating. On the other hand, a coating based on a vinyl resin may be modified with less expensive alkyd resins to reduce applied cost of the coating.

In order to obtain optimum coating properties with vinyl resins containing alcoholic hydroxyl groups, such vinyl resin must be reacted with a polyfunctional molecule, wherein such polyfunctionality is capable of chemically reacting with the alcoholic hydroxyl groups attached to the vinyl resin. A common class of such polyfunctional molecules is amine-formaldehyde resins (e.g. urea-, melamine- and triazine formaldehyde resins). In order for optimum crosslinking to occur between the vinyl copolymer and the amine-formaldehyde resin, such resin combinations must exhibit mutual compatibility in the polymeric coating.

Table I illustrates the dependence of compatibility, of vinyl chloride copolymers with other resin systems, on the proportion of comonomers in the vinyl resin.

These data illustrate good to excellent compatibility for copolymers having less than 15 percent by weight vinyl acetate; copolymers with 15 percent or greater vinyl acetate content have very poor compatibility with the same alkyd and amine-formaldehyde resins.

The method of polymerization is very important to vital properties of these resins in coating applications. When prepared according to example 1, vinyl chloride-hydroxypropyl acrylate-vinyl acetate copolymers are characterized by excellent performance in coating applications as a result of the compositional uniformity and narrow molecular weight distribution of the molecular entities; when prepared according to example 3, polymers of equal average molecular weight and gross composition are characterized by non-uniform composition and broad distribution of molecular weight, resulting in deficient properties of resin solutions and inferior coating performance.

The vinyl chloride copolymers described herein are utilized principally in industrial coating applications wherein coatings are formed by application of the resin solution to a suitable substrate after which evaporation of the volatile solvent produces a continuous polymeric film. Therefore, the relationship between resin concentration and solution viscosity is an extremely important property of a resin utilized in the solution form for production applications—the applied cost of a coating of constant thickness is inversely proportional to the resin concentration of the solution from which the coating is prepared.

Also, coatings which can be applied from solutions with increased resin concentration are ecologically more desirable since lesser quantities of volatile pollutants (solvents) are emitted into the atmosphere during the coating process.

Viscosity and transmission characteristics of solutions of vinyl chloride copolymers, prepared as described in examples 1 and 3 are presented in Table II for solutions at different resin concentrations.

TABLE II

BROOKFIELD VISCOSITY OF SOLUTIONS OF VINYL CHLORIDE COPOLYMERS[1]

| Vinyl Resin No. | Polymerization Process | Resin Solids, Wt. % | Initial Viscosity, cps[2] | 8 Day Viscosity, cps[3] | Solution Turbidity, % Transmission at 600 mµ[4] |
|---|---|---|---|---|---|
| VII | example 1 | 25 | 100 | 100 | 82.5 |
| | | 30 | 265 | 305 | 73.9 |
| | | 35 | 1,120 | 1,260 | 68.1 |
| VIII | example 3 | 25 | 160 | 170 | 5.5 |
| | | 30 | 1,340 | 2,130 | 4.2 |
| | | 35 | 11,500 | gel | 2.0 |

TABLE II

BROOKFIELD VISCOSITY OF SOLUTIONS OF VINYL CHLORIDE COPOLYMERS[1]

| Vinyl Resin No. | Polymerization Process | Resin Solids, Wt. % | Initial Viscosity, cps[2] | 8 Day Viscosity, cps[3] | Solution Turbidity, % Transmission at 600 m$\mu$[4] |
|---|---|---|---|---|---|

[1] Solvent system for vinyl chloride resin solutions:

| Component | Wt. % |
|---|---|
| isobutyl acetate | 56.2 |
| toluene | 20.8 |
| heptane | 11.3 |
| methyl ethyl ketone | 6.7 |
| cyclohexanone | 5.0 |
| | 100.0 |

[2] Brookfield viscosity at 25°C and 30 rpm measured 24 hours after solution preparation.
[3] Brookfield viscosity (at 25°C and 30 rpm) of solutions in footnote (1) after 8 days storage time at 25°C.
[4] Percent transmission in a 5 cm. cell.

These data illustrate that the viscosity of resin VII increases slowly with increasing resin content in comparison to that observed for resin VIII. Also, Table II shows viscosity of these resin solutions after storage for 8 days at 25°C; concentrated solutions of resin VII display markedly superior storage stability compared to that observed with resin VIII. These data suggest a maximum usable solids level of about 25 percent for resin VIII, while resin VII can be used at 35 percent or greater without encountering rapidly increasing viscosity upon storage at ambient conditions.

In addition, the large changes in solution viscosity accompanying small changes in resin concentration observed with resin VIII would render operation of a production line difficult due to narrow viscosity ranges demanded in current practice.

Solution turbidity data presented in Table II shows a dramatic dependence on molecular uniformity; solutions of resin VII have slight visual haze ( $\geq$ 68 percent transmission) while solutions of resin VIII are essentially opaque.

Another vital characteristic of the subject vinyl chloride copolymers is their relative thermosetting reactivity, i.e., the rate at which the individual resins chemically coreact with other polyfunctional molecules. Under the polymerization conditions described, thermoplastic coatings prepared from these low molecular weight resins have poor film strength, solvent resistance and other related properties are deficient. However, when properly formulated in thermoset coating systems, wherein the alcoholic hydroxyl group is chemically reacted with a polyfunctional molecule such as is present in amineformaldehyde resins, the resultant coatings have excellent solvent resistance, toughness and flexibility provided the vinyl chloride resin employed is uniform in composition and has a rather narrow molecular weight range, and the extent of the chemical reaction with the amine-formaldehyde resin is sufficient to provide the desired coating properties.

The differences in the relative thermosetting reactivity between vinyl resins VII and VIII is readily apparent when the individual vinyl resins are combined with a suitable coreactant, such as a urea-formaldehyde resin, to form a thermosetting coating system. The weight percent of the coating that is insoluble in acetone is taken as a measure of the relative extent of coreaction in this coating system. Table III presents these data for a 180°F bake temperature which is commonly used in wood, paper, foil, film, magnetic tape and other coating applications.

TABLE III

RELATIVE THERMOSETTING REACTIVITY OF VINYL CHLORIDE COPOLYMERS

| Vinyl Resin No. | Polymerization Process | Acetone Insolubility at 180°F Bake Temperature[1] | | | | | |
|---|---|---|---|---|---|---|---|
| | | 10 min. | 20 min. | 30 min. | 40 min. | 50 min. | 60 min. |
| VII | example 1 | 41.3 | 83.2 | 91.7 | 90.9 | 92.0 | 92.4 |
| VIII | example 3 | 5.1 | 54.6 | 57.4 | 62.4 | 65.6 | 66.2 |

[1] Weight percent of a 2-mil thermoset coating (100 parts vinyl resin to 12 parts Uformite F-240 resins) insoluble in acetone after the indicated bake time at 180°F.

Resin VII reacts at a much faster rate and achieves a much higher degree of crosslinking after protracted bake conditions (i.e., 60 minutes at 180°F) than is observed with resin VIII.

Finally, vinyl resins VII and VIII display different film compatibility with alkyd resins as a result of the different synthetic techniques employed in their preparation. Compatibility data in Table IV illustrates that resin VII, with superior compositional uniformity, is superior to that of resin VIII.

These above data (and the following) demonstrte that dramatic differences in solution viscosity and turbidity characteristics as well as thermosetting reactivity result when different processes are employed in the preparation of vinyl chloride copolymers of equivalent gross composition and average molecular weight.

TABLE IV

FILM COMPATIBILITY OF VINYL CHLORIDE COPOLYMERS WITH COMMERCIAL ALKYD RESINS

| Vinyl Resin No. | Polymerization Process | Film Compatibility[1] | |
|---|---|---|---|
| | | Neolyn 35 D | Duraplex A-27 |
| VII | example 1 | 9 | 10 |
| VIII | example 3 | 5 | 8 |

[1] Compatibility ratings of clear films: 5 = poor compatibility with compatibility increasing as numerical rating increases until excellent compatibility of 10 is attained.

Resins prepared by the continuous process described in synthesis example 1 are uniform in composition and have a narrow molecular weight range and, therefore, demonstrate markedly superior performance in comparison to the heterogeneous product obtained when employing the synthetic process described in example 3.

I claim:

1. An uniformly random copolymer having a mer content of about 70 to 90 weight per cent vinyl chloride derived mers, based in weight of the copolymer, about 10 to 30 weight per cent based on the weight of the copolymer, of an ester derived mers having the formula:

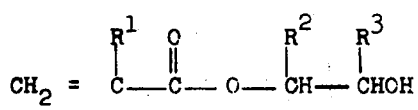

wherein $R^1$, $R^2$ and $R^3$ are each one of hydrogen or methyl, and up to about 15 weight percent, based on the weight of the copolymer, of an alkyl ester of an alpha, beta-ethylenically unsaturated acid or a vinyl ester of a saturated carboxylic acid derived mers, which copolymer has an inherent viscosity of about 0.2 to about 0.5, determined at 30°C using 0.2 grams of the copolymer in a deciliter of cyclohexanone, and a ratio of weight average to number average molecular weight of not greater than about 2.

2. The copolymer of claim 1 wherein the ester is hydroxypropylacrylate.

3. The copolymer of claim 2 wherein vinyl acetate is present therein.

* * * * *

UNITED STATES PATENT OFFICE
CERTIFICATE OF CORRECTION

PO-1050 (5/69)

Patent No. 3,884,887            Dated May 20, 1975

Inventor(s) Donald R. Montgomery

It is certified that error appears in the above-identified patent and that said Letters Patent are hereby corrected as shown below:

Page 18, Table III of application.
(Column 8, Table III of Grant (Second Portion))

Under column sub-headings:

"   40 min.    50 min.     60 min.   "

```
90.9       92.0              92.4
62.40590765.60666.366.2
``` should read

--  40 min.   50 min.   60 min.  --

```
90.9      92.0      92.4
62.4      65.6      66.2
```

Signed and Sealed this sixteenth Day of March 1976

[SEAL]

Attest:

RUTH C. MASON
*Attesting Officer*

C. MARSHALL DANN
*Commissioner of Patents and Trademarks*